US011919025B2

(12) United States Patent
Peters et al.

(10) Patent No.: US 11,919,025 B2
(45) Date of Patent: *Mar. 5, 2024

(54) LOW PRESSURE PLURAL COMPONENT FOAM SPRAY SYSTEM

(71) Applicants: Thomas Joseph Peters, Greensboro, GA (US); James F. Peterson, Buckhead, GA (US); David H. Faulkner, Sarasota, FL (US)

(72) Inventors: Thomas Joseph Peters, Greensboro, GA (US); James F. Peterson, Buckhead, GA (US); David H. Faulkner, Sarasota, FL (US)

(73) Assignee: SPRAY FOAM SYSTEMS, LLC, Greensboro, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,167

(22) Filed: Jun. 7, 2022

(65) Prior Publication Data

US 2022/0297143 A1 Sep. 22, 2022

Related U.S. Application Data

(63) Continuation of application No. 15/729,755, filed on Oct. 11, 2017, now Pat. No. 11,383,253.

(Continued)

(51) Int. Cl.
*B05B 7/04* (2006.01)
*B05B 7/00* (2006.01)
(Continued)

(52) U.S. Cl.
CPC .......... *B05B 7/0416* (2013.01); *B05B 7/0037* (2013.01); *B05B 7/0043* (2013.01);
(Continued)

(58) Field of Classification Search
CPC .............................. B05B 7/0031; B05B 7/0043
See application file for complete search history.

(56) References Cited

U.S. PATENT DOCUMENTS 4,060,572 A * 11/1977 Widmann ............. B29B 7/7409
261/50.1
5,163,584 A * 11/1992 Huber ................... B29B 7/7678
222/145.5
(Continued)

OTHER PUBLICATIONS

New Nordson EFD Static Mixer Optimizes Mix performance in a Significantly Shorter Length; website: https://www.nordson.com/en/divisions/efd/about-us/news/new-nordson-efd-static-mixer-optimizes-mix-performance-3-8-16, Mar. 8, 2016, downloaded Jan. 13, 2021.
(Continued)

*Primary Examiner* — Michael P. Rodriguez
(74) *Attorney, Agent, or Firm* — Thomas | Horstemeyer, LLP

(57) ABSTRACT

A method and apparatus for applying a foamed mixture of paints on a structural surface. A continuous stream of high velocity gas moves through a nozzle and is directed toward the structural surface, and two or more paints may be intermittently moved into the gas stream of the nozzle and aerated and mixed with each other and moved with the gas stream to form a foam that is applied to the structural surface. The components of the foamed mixture may include single component or plural component materials such as polyurethane foam, adhesive, and polyurea formulations, and may be moved through a volumetric metering device consisting of material heaters, a heated hose, and an applicator gun. The nitrogen gas stream fluidizes the mixture as it passes through and out of the nozzle and forms the mixture into a foam that is applied to the structural surface.

8 Claims, 5 Drawing Sheets

Related U.S. Application Data

(60) Provisional application No. 62/407,730, filed on Oct. 13, 2016.

(51) Int. Cl.
| | |
|---|---|
| *B05B 7/16* | (2006.01) |
| *B05B 12/00* | (2018.01) |
| *B05D 1/02* | (2006.01) |
| *C08J 9/12* | (2006.01) |
| *C08J 9/30* | (2006.01) |
| *E04B 1/76* | (2006.01) |
| *B05D 1/34* | (2006.01) |

(52) U.S. Cl.
CPC .......... *B05B 7/0408* (2013.01); *B05B 7/0483* (2013.01); *B05B 7/16* (2013.01); *B05B 12/0026* (2018.08); *B05D 1/02* (2013.01); *C08J 9/122* (2013.01); *C08J 9/30* (2013.01); *E04B 1/76* (2013.01); *B05B 7/1693* (2013.01); *B05D 1/34* (2013.01); *C08J 2201/022* (2013.01); *C08J 2203/06* (2013.01); *C08J 2207/04* (2013.01); *C08J 2375/04* (2013.01)

(56) References Cited

U.S. PATENT DOCUMENTS

| | | | |
|---|---|---|---|
| 5,529,245 | A | 6/1996 | Brown |
| 5,893,486 | A * | 4/1999 | Wasmire ............... B05C 17/015 366/101 |
| 6,527,203 | B2 | 3/2003 | Hurray |
| 6,533,189 | B2 | 3/2003 | Kott |
| 6,705,539 | B1 * | 3/2004 | Bien ..................... B29B 7/7605 239/10 |
| 7,717,357 | B2 | 5/2010 | Gantenbein |
| 11,383,253 | B2 * | 7/2022 | Peters .................. B05B 7/0483 |
| 2005/0023296 | A1 * | 2/2005 | Bien ..................... G05D 11/132 222/146.1 |
| 2015/0360853 | A1 * | 12/2015 | Nicmanis .............. B05B 7/0025 222/1 |
| 2016/0184847 | A1 | 6/2016 | Hummerlund |

OTHER PUBLICATIONS

Nordson Catalog—2K Product Catalog—Third Edition, issued Oct. 26, 2013.
Google search showing the Emipirefoam catalog was available before Oct. 2016; search performed Jan. 13, 2021.

* cited by examiner

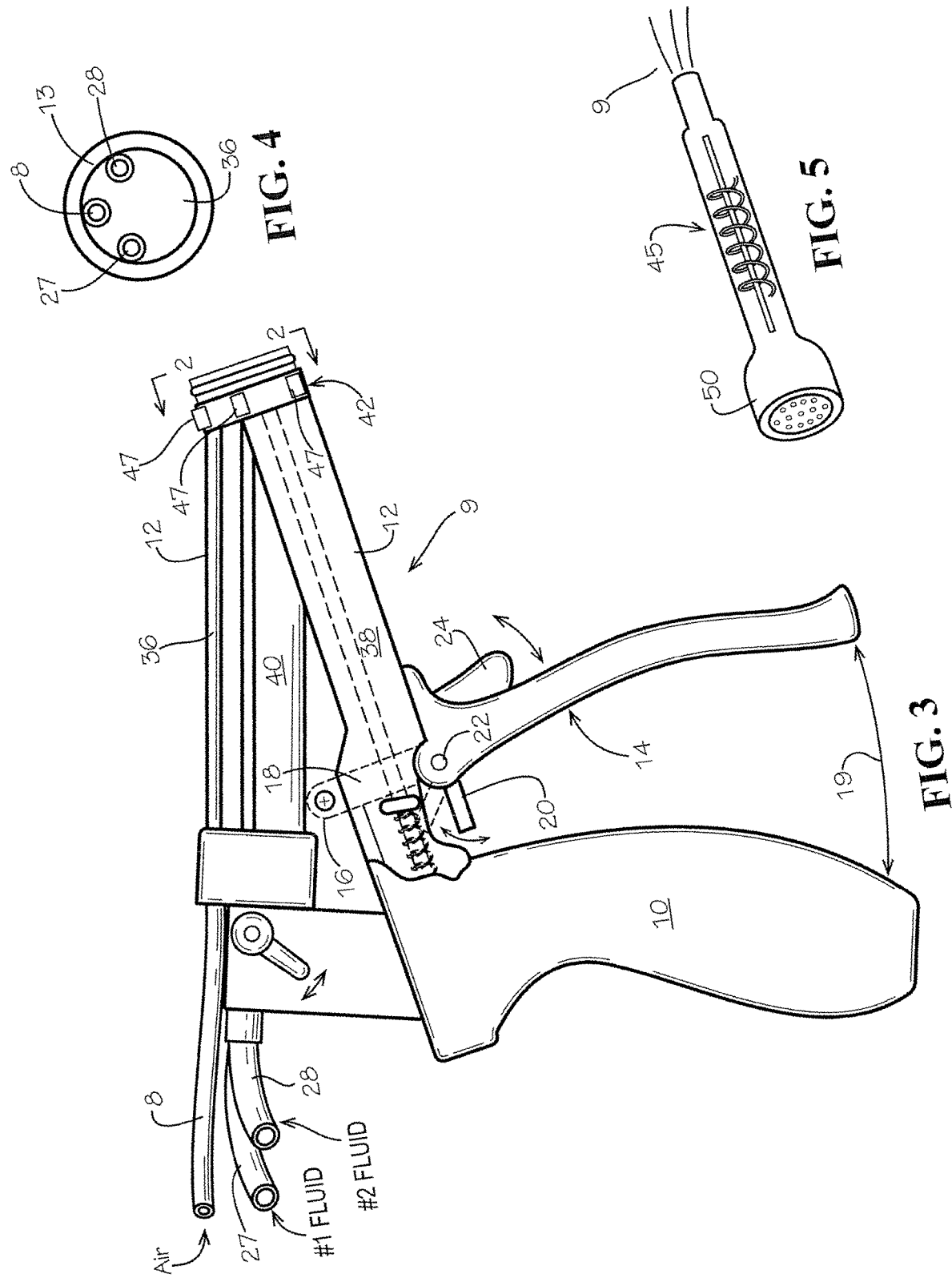

LOW PRESSURE PLURAL COMPONENT FOAM SPRAY SYSTEM

CROSS REFERENCE TO RELATED APPLICATIONS

This application is a continuation of U.S. utility application having Ser. No. 15/729,755 and filed on Oct. 11, 2017, which claims priority with respect to U.S. provisional patent application Ser. No. 62/407,730, filed in the U.S. Patent and Trademark Office on Oct. 13, 2016, the contents of both of which are incorporated by reference in their entireties as if fully set forth herein.

BACKGROUND OF THE INVENTION

This Invention concerns the process and apparatus for applying foam insulation to building surfaces for insulating the buildings from heat transfer.

For many years fiberglass has been used as heat insulation on surfaces of building structures that are exposed to the atmosphere. Typically, fiberglass is manually applied to walls, ceilings, floors, roofs, air ducts, pipes and other surfaces to avoid transfer of heat. Spray foam, sometimes referred to as "SPF", usually is a polyurethane foam and has become an alternative to traditional building insulation such as fiberglass. SPF usually comprises a liquid mixture of isocyanate and polyol resin. The liquid components are moved under pressure to come together at the tip of a spray gun where a stream of high velocity gas forms the components in an expanding foam that is sprayed onto the structural surfaces as described above, as well as roof tiles, concrete slabs, wall cavities, and through drilled holes in a cavity of a finished wall. The SPF technology is relatively new to the construction industry.

Various systems have been developed that used high pressure equipment to apply a two component spray foam to structural surfaces. The chemical components react once they have been mixed together and that have been applied to the structural surface of a building. They expand in a few seconds into a closed cell foam clinging to the structural surface. The two component low pressure spray foam system may be used for remodel jobs and it usually is a slow rise formulation injection foam.

There are multiple types of SPF. The most commonly used are light-density open-cell and medium-density closed-cell spray foam. Both types are thermoset cellular plastics usually comprising millions of small cells. Foam insulation blocks all three types of heat transfer: conductive, radiant and convective. SPFs are great energy savers as well as being moisture resistant, mold resistant and noise reducing. SPF insulation can often times be eligible for state and federal energy saving tax deductions.

SPF is also used worldwide in industrial markets for applications such as RV manufacturing, boat manufacturing, mobile home manufacturing, and other types of industrial manufacturing applications where adhesives, sealants, and insulations are used. In addition, SPF is used for geotechnical applications such as void fill and lifting and leveling of surfaces that have sunk due to unstable soils.

Polyurea is a plural component chemistry that is created in a very similar method to that of spray polyurethane foam. Two chemicals (A & B) are mixed together usually at a proper ratio of about 1:1 and sprayed out to form an instant fast set coating that is used in many different types of applications. Some of the applications include secondary containment in oil fields, roof coatings, truck bed liners, chemical resistant waterproofing, on site lining creation for fracking, waterproofing in pond liners, swimming pool liners, and many other types of applications that may require a seamless, flexible coating that can withstand UV light over time. Probably, the most well-known type of polyurea is a truck bed liner.

Traditional prior art plural component spray systems used for spraying polyurethane or other plural component chemicals generally are complex, large pieces of equipment that require high pressure impingement mixing in order to properly mix chemicals and to achieve adequate mixing and quality finished products. High pressure spray systems typically store products in fifty-five gallon drums and utilize transfer pumps to feed high pressure proportioning systems that then mix the chemicals at high pressures through impingement mixing nozzles incorporated in a spray gun used for product delivery. This prior art system may be a hazardous delivery system and requires considerable training to operate and maintain.

Low pressure foam systems are chemicals that are usually mixed at 300 pounds per square inch or less. The materials are stored in pressure vessels and compressed with nitrogen in order to propel the chemicals through the lines. Material delivery options available today are limited in that equipment that can accommodate low pressure spray processing in drums, totes, or other non-pressurized cylinders apparently are not currently available in the marketplace.

It appears that prior art low-pressure spraying of high-pressure plural component system products was not practically achievable.

Prior to the development of this inventor's low pressure foam spray system identified by the trademark Nitrosys™, it appears that other systems in the marketplace required "manual calibration" and usually consisted of systems capable of heating the material with a heated hose. The prior art applicator would attach a set of plural component heated hoses directly to the A and the B tank and would pressurize the tanks with nitrogen using a regulator for each tank. After the tanks were pressurized, the applicator would take a sample spray of each material A and B simultaneously in order to get a weight of the A and B material. Upon weighing the A and B material, the user would be required to determine the ratio of the material and make adjustments to the Nitrogen pressure in the A and B tanks to either increase or decrease tank head pressures in order to increase or decrease flow volume of the A and/or B material.

It appears that low pressure refillable formulations require users to process A and B materials at a temperature at or around 80 degrees F. in order for the chemical reaction to occur properly. If material temperatures were not preheated to these temperatures and the temperatures maintained for the length of the hose leading from the supply to the nozzle, the material would cool off and would not react properly.

Advantages

Because of the simplicity and smaller size and weight of the invention as disclosed herein, the process of applying spray foam on structural surfaces and elsewhere will allow the average construction worker to work in the plural component spray polyurethane business market.

Advantages of the invention disclosed herein as compared to the prior art include:
1. On Ratio Mixing
2. Preheated materials allows spraying in winter time
3. Reduced labor costs due less time spent calibrating 4. Reduced chemical costs due to on ratio materials and less waste due to no calibrations required
5. Low power requirements of 120V
6. Safer for applicators and building owners due to less likelihood of human exposure
7. Less startup time
8. Use of air as a mixing agent is safe and inexpensive.

Other advantages of the invention as disclosed herein are believed to include:
1. Simplicity and cost of application equipment
2. Reduced operating expense
3. Reduced overhead
4. Less training than with traditionally available systems
5. Safe operation
6. Reduced chemical atomization resulting in less worker exposure to chemicals during application
7. Up to 24× faster re occupancy times than traditional systems
8. Reduced downtime
9. Much smaller equipment footprint

BRIEF DESCRIPTION OF THE DRAWINGS

FIG. 3 is a side view of the spray gun with parts removed to illustrate functions of the gun.

FIG. 4 is an end view of the support barrel, taken along arrows 2-2 of FIG. 3, showing the support disk and the ends of the gas and paint conduits that extend through the support disk.

FIG. 5 is a perspective view of the assembled nozzle that fits onto the end of the support barrel.

DETAILED DESCRIPTION

Figure 1:
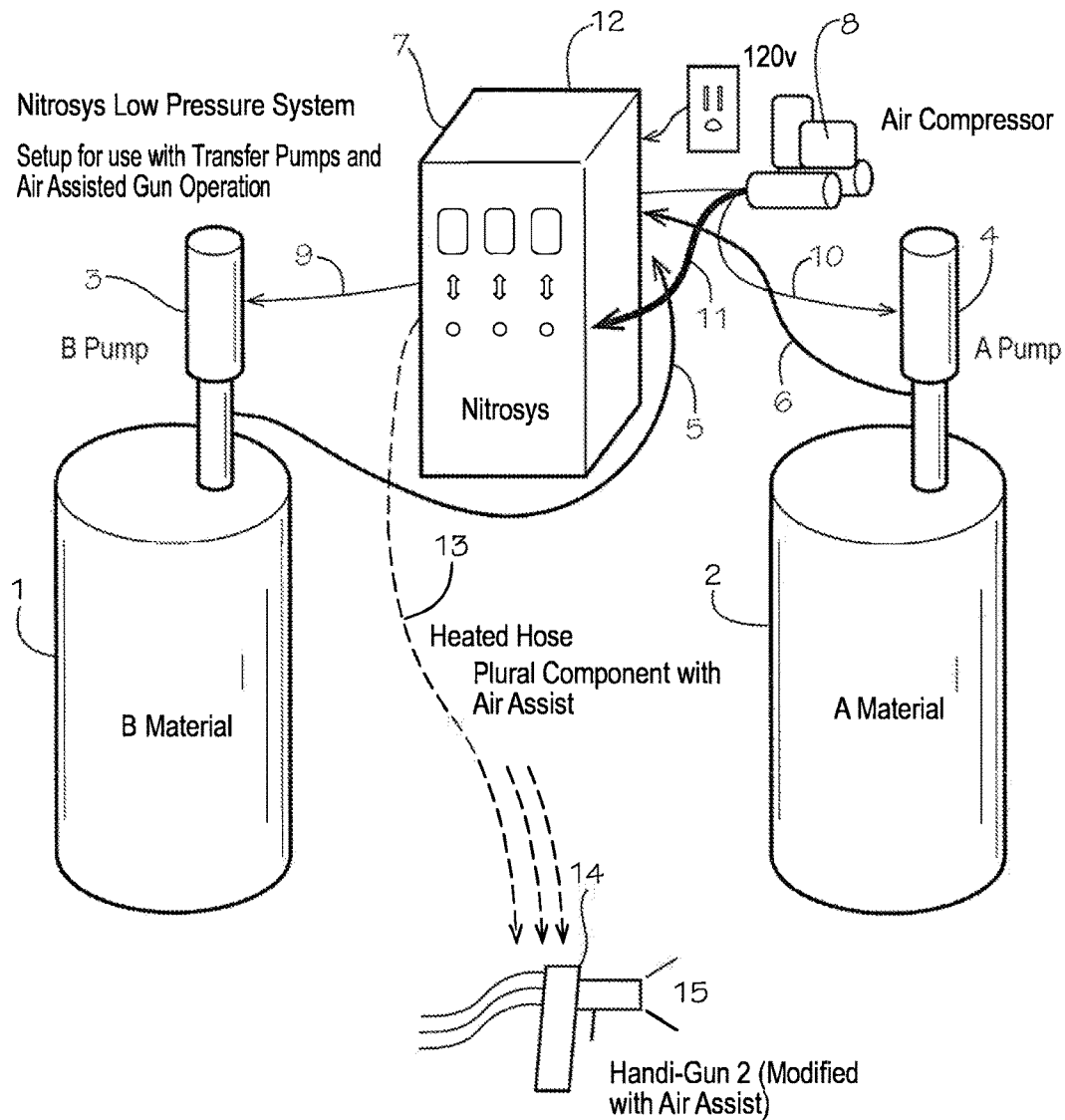
FIG. 1 is a schematic illustration of a setup of equipment for using the hand held applicator "gun" that mixes and urges the gas and paints to form the foam that is to be applied to a building structure.

Referring now in more detail to the drawings in which like numerals indicate like parts throughout the several views, FIG. 1 is an illustration of the arrangement of the components that supply the liquid paint and gas to the applicator gun.

One of the liquid paint materials is stored in container A which is a non-pressurized container, which may be a 5, 15, 55, or 250 gallon drum or tote. Likewise, another liquid paint material is stored in a non-pressurized container B of the same capacities in a drum or tote. Transfer pumps 3 and 4 are applied to both containers of the A and B materials for urging these liquid materials through separate conduits to the Nitrosys low pressure proportioner, which then sends the materials through a heated hose to the hand-held applicator gun 15. The Nitrosys device may include electronically controlled pre-heaters, volumetric metering devices, electronically controlled heated hose, stroke counter, pump louve system, and may be powered by 120 volt power and metering device, as is necessary to transmit the paints and air to the applicator gun at the correct ratio, temperature and flow rate.

Figure 2:
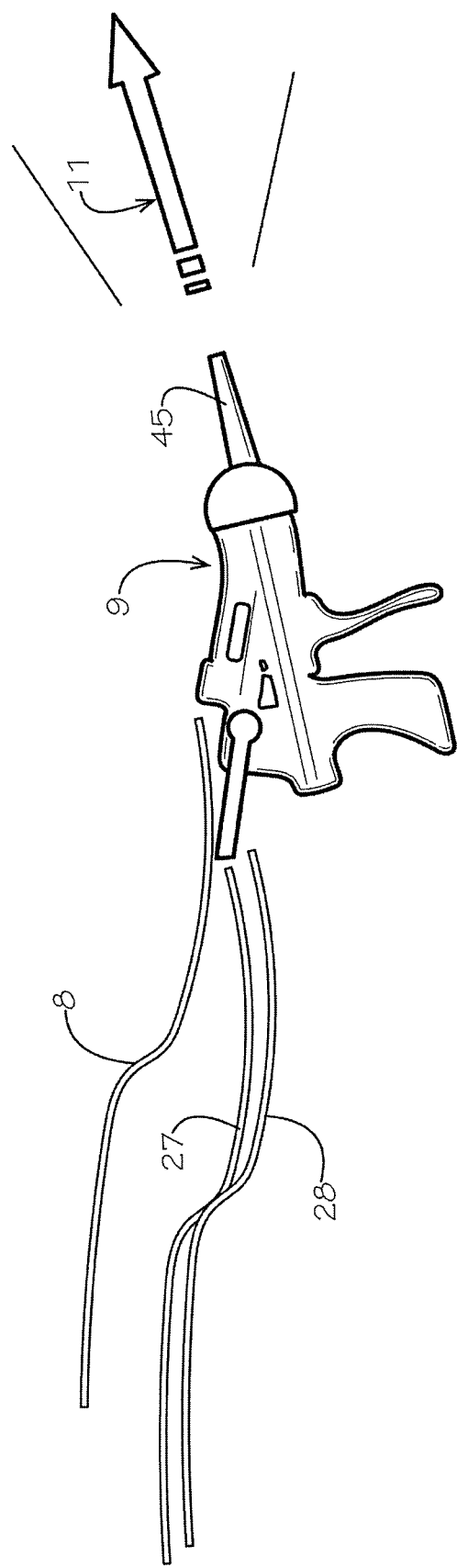
FIG. 2 is a side view of the hand held spray gun that mixes and applies the foam.

FIG. 2 is a closer view of the applicator gun, showing the three conduits leading to it. One conduit 8 is for the application of gas, such as nitrogen or air and two lines 27 and 28 are for the application of paints, with the resulting mixture of foam material illustrated in FIG. 2 as moving out of the spout 45 of the gun.

FIG. 3 shows the spray gun in more detail, with parts shown in cross section to illustrate the internal components thereof.

As shown in FIG. 3, spray gun 9 includes a handle 10 and a support barrel 12 that extends approximately at a right angle from the handle.

A hand lever 14 is pivotally mounted to the support barrel 12 at pivot pin 16 so that the hand lever 14 moves in a large diameter arc around the lever pivot pin 16 as shown by dash line 19. Trigger 24 is pivotally mounted to the hand lever by pivot pin 22, and lock latch 20 is rigidly mounted to trigger 24 and pivots in response to the movements of the trigger about pivot pin 22 between the solid line and dash line positions. When the trigger 24 is pressed inwardly toward the hand lever 14, the lock latch 20 pivots about the pivot pin 22 and moves out of alignment with the handle and allows the hand lever to move toward engagement with the handle 10. This movement of the hand lever allows paints to move under pressure through the conduits of the spray gun. However, if trigger 24 is not pressed by the operator and the operator tries to dose the hand lever, the lock latch 20 engages against the facing surface of the handle 10 so as to prevent the movement of the trigger.

As shown in FIG. 3, the three conduits 8, 27 and 28 that extend from the compressed gas and paint sources extend through the support pipes 36 and 40 of the spray gun 9 and to its nozzle 45 that is applied to the end of the barrel 12. As shown in more detail in FIGS. 6 and 7, air hose 8 and paint hoses 27 and 28 extend through pipe support disk 36 toward the nozzle 45. As described before, air pressure hose 8 extends through the air hose support conduit 36 while the fluids, such as the paints, extend through the paint hose support conduit 40. All of the hoses 8, 27 and 28 extend longitudinally through the support barrel toward the nozzle at the distal end of the support barrel 12, extending through support ring 36 at the delivery end of the support barrel 12.

Figure 6:
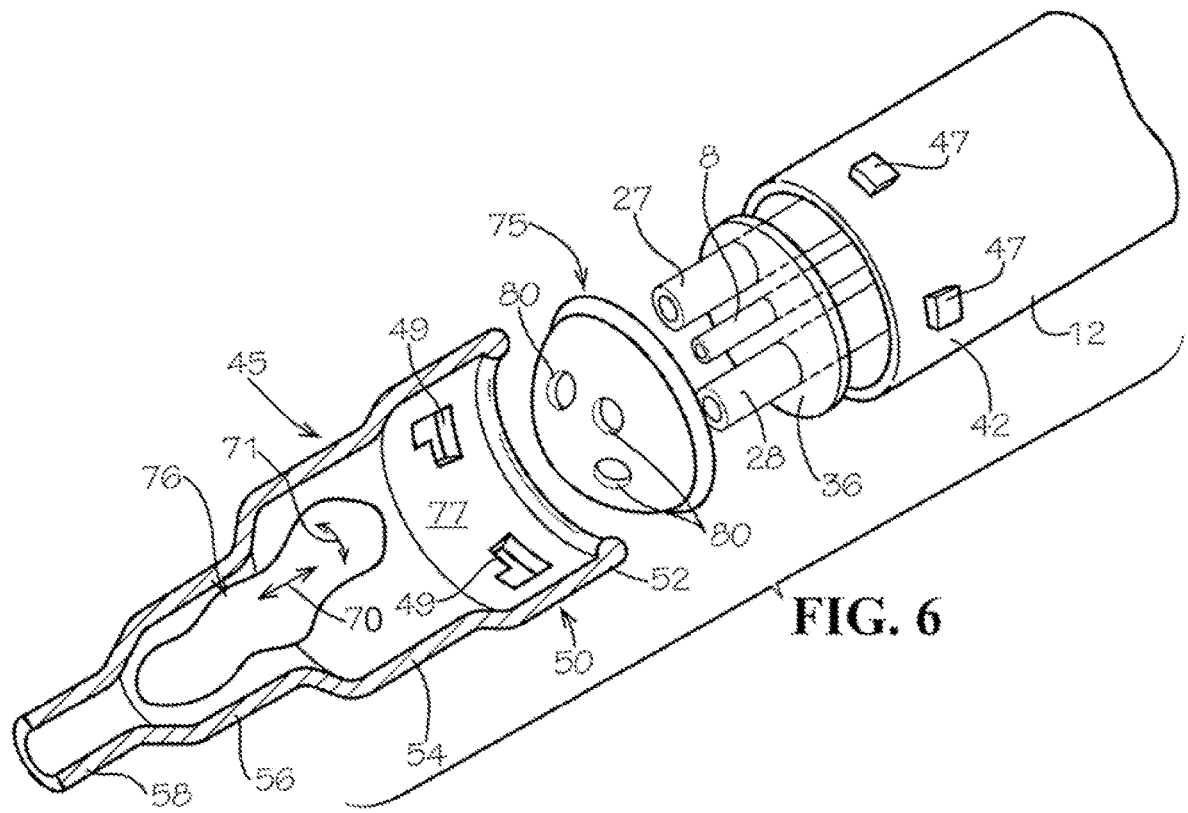
FIG. 6 is an expanded perspective view showing the end of the support barrel, its conduits and conduit support disks, the convex sieve, and the nozzle end with the free flowing diverter in the extended nozzle.

As shown in FIGS. 5 and 6, the nozzle 45 includes a cylindrical mounting collar 50 that connects to the exterior surface of the support barrel 12. The collar is enlarged and telescopically fits about the exterior of the support barrel 12. The nozzle 45 extends away from its mounting collar 50 and is of first reduced diameter at intermediate tube 54, second reduced diameter at projection tube 56, and ultimately at the smaller third reduced diameter exit spout 58.

A flow diverter 76 is positioned interiorly of the nozzle 45 and is of an irregular external shape, somewhat spiral and elongated to the extent that it can spin and otherwise move loosely within the nozzle 45, can move longitudinally and twist circumferentially as indicated by the arrows 70 and 71 of FIG. 6.

Figure 7:
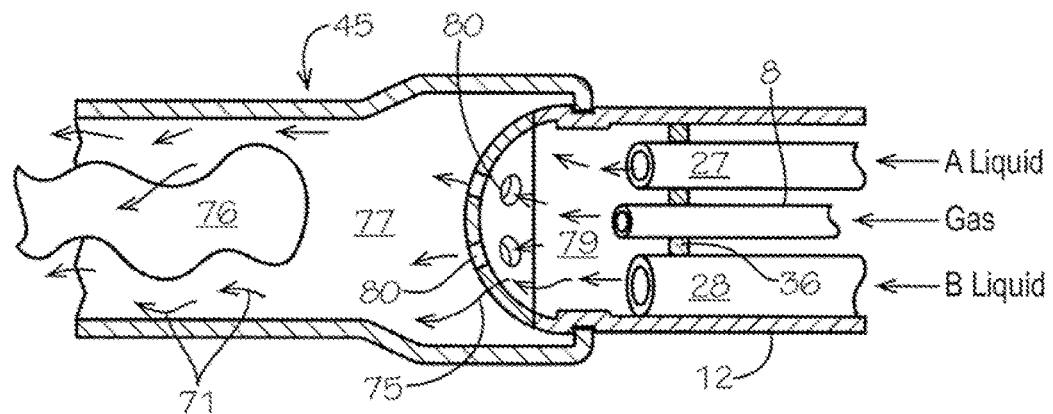
FIG. 7 is a side cross section of the portion of the assembled nozzle extending away from the support barrel.

A sieve 75 includes a perimeter mounting rim that is mounted on the open end of the support barrel 12. As shown in FIG. 7, the sieve 75 is concave and has a plurality of openings 80 formed there through for the passage of paint and gas delivered by conduits 8, 27, and 28. The sieve 75 directs the paints and air into a focal point at the end of the sieve 75 creating an air nucleated impingement mixing method that starts the chemical reaction process.

The free flowing diverter 76 is of irregular shape and moves in random turns within the smaller portions of the nozzle 45, as indicated at 71 in FIGS. 6 and 7, causing random turbulence within the nozzle 45, indicated by the arrows in FIGS. 6 and 7. This usually forms a churning pocket 77 downstream from the concave sieve 75 so that the required movements of paint and gas moving through the sieve and then through the churning pocket 77 and finally about the free flowing diverter 76 to the exit spout 58 requires a thorough mixing of the churning liquids to be delivered through the exit spout.

Further, there is an intermediate space 79 shown in FIG. 7 between the ends of the air hose and paint hoses 26-28, where mixing of the gas and paint begins at the sieve 75. The straining of the gas and paint through the sieve openings and the turbulence of the gas and paint leaving the sieve creates preliminary mixing of the gas and liquid paint even before they enter the churning pocket 77, and then being required to move about the free flowing diverter 76 and then out of the exit spout 58. This requires a significant amount of churning of the paints and gas and of different pressures within the delivery end of the device, particularly through the sieve, nozzle, and the free flowing diverter.

Figure 8:
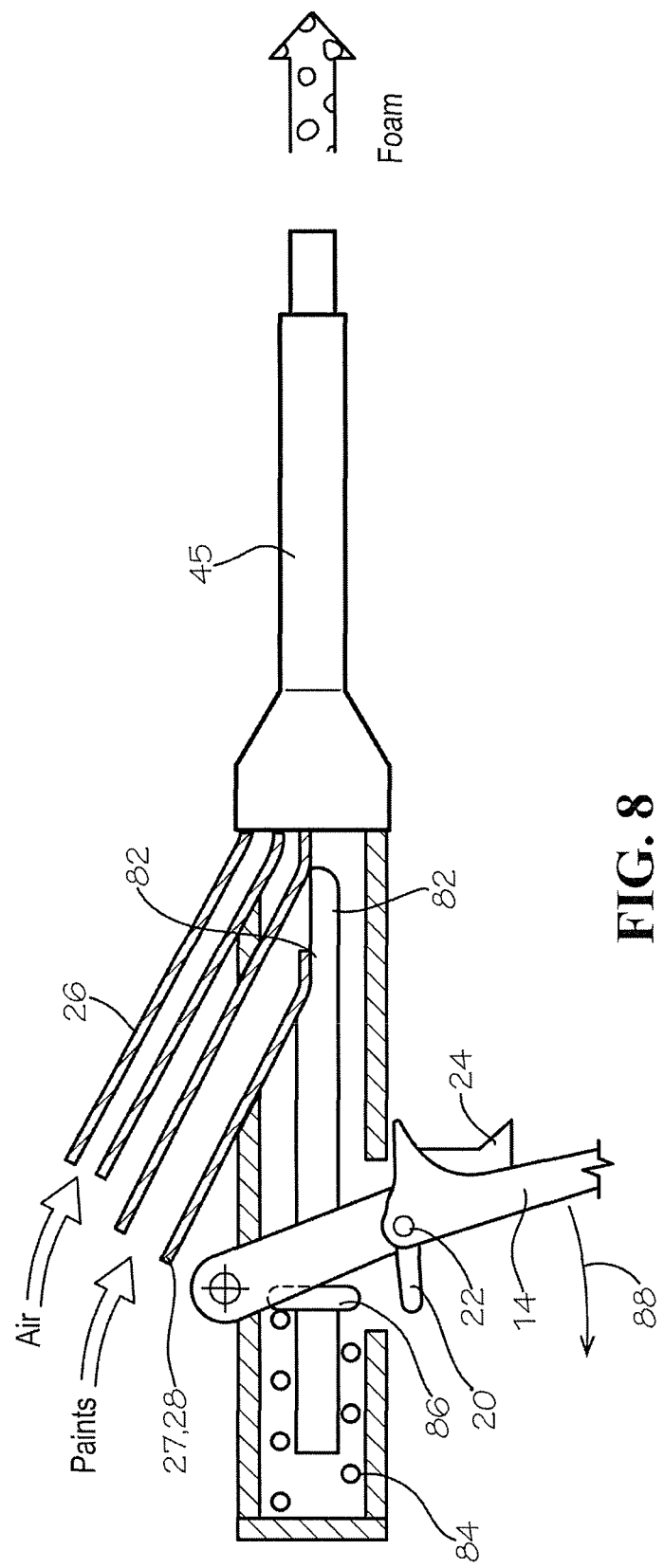
FIG. 8 is a partial cross section of the barrel and valve that controls the flow of paints through the gun.

FIG. 8 illustrates the valves that operate in response to the movements of the hand lever 14. A valve plunger 82 is biased by coil compression spring 84 toward the closed position of the valve plunger. The valve plunger blocks the paint hoses 27 and 28, while the air hose remains unblocked and moves continuously into the nozzle 45, as previously described. The coil compression spring 84 engages the compression ring 86 mounted on the valve plunger 82, and the coil compression spring engages and urges the valve 82 into its closed position, as illustrated. When the hand lever is tilted in the direction as indicated by arrow 88, the hand lever pushes the valve away from the paint hoses, allowing paints to move through their hoses in response to the pressure applied in the original containers of the paints. In the meantime, the air hose 26 remains open so that gas continuously moves into and through the nozzle 45. The components of the foamed mixture may include single component or plural component materials such as polyurethane foam, adhesive, and polyurea formulations, and may be moved through a volumetric metering device consisting of material heaters, a heated hose, and an applicator gun. The nitrogen gas stream fluidizes the mixture as it passes through and out of the nozzle and forms the mixture into a foam that is applied to the structural surface.

Although a preferred embodiment of the invention has been disclosed in detail herein, variations and modifications of the disclosed invention may be made without departing from the spirit and scope of the invention as set forth in the following claims.

The invention claimed is:

1. A low-pressure system for applying plural foam components to a surface comprising:
   a. a materials supply source comprising each of:
      i. a first non-pressurized container comprising a part A material; and
      ii. a second non-pressurized container comprising a part B material;
   b. a volumetric metering device in independent fluid communication with each of the first and second non-pressurized containers, wherein the volumetric metering device comprises each of:
      i. a pump configured to convey each of a part A material stream and a part B material stream in metered amounts from the first and second non-pressurized containers; and
      ii. a pre-heater configured to heat each of the part A and part B materials streams;
   c. a heated hose in fluid communication with the volumetric metering device, the heated hose configured to convey each of the part A and part B materials streams in respective part A and part B materials conduits to a hand held applicator;
   d. an air source; and
   e. the hand held applicator comprising:
      i. a support barrel having an end configured with a mixing nozzle mounting collar;
      ii. a pair of fluid conduits for conveying each of the part A and part B materials streams into a mixing nozzle engaged with the mixing nozzle mounting collar, wherein each of the part A and part B materials streams are conveyed into the mixing nozzle from their respective fluid conduits;
      iii. a gas conduit for providing gas to the mixing nozzle when the part A and part B materials streams are each flowing into the mixing nozzle; and
      iv. a fluid volume control trigger mounted to the support barrel for opening and closing of each of the part A and part B materials streams fluid conduits to start and stop flow of the part A and part B materials streams into the mixing nozzle,
   wherein the system is configured to mix the metered amounts of part A and part B materials streams conveyed from the respective part A and part B materials conduits into the mixing nozzle with air conveyed from the gas conduit, wherein the mixing occurs in both an intermediate space located at ends of the fluid conduits and in an interior cavity of the mixing nozzle, and wherein the mixing occurs at a pressure of 300 pounds per square inch or less when the volumetric metering device is operational to cause each of the part A and part B materials streams to flow from the heated hose part A and part B materials conduits into the hand held applicator for dispensing of the mixed part A and part B materials streams to a surface via an exit spout on an end of the mixing nozzle.

2. The system of claim 1, wherein the hand held applicator further comprises a sieve configured for engagement at a location proximate to an end of the mixing nozzle mounting collar.

3. The system of claim 1, wherein the hand held applicator is configured for gas nucleated mixing of each of the part A and part B material streams with air in the intermediate space and in the mixing nozzle upon user engagement of the fluid volume control trigger operational with the volumetric metering device.

4. The system of claim 1, wherein the hand held applicator is configured with each of:
   a. a first opening configured to receive gas from the gas conduit;
   b. a second opening configured to receive the part A material stream from the part A material stream conduit; and
   c. a third opening configured to receive the part B material stream from the part B material stream conduit.

5. The system of claim 1, wherein an air compressor is in fluid communication with the gas conduit via an air stream conduit incorporated in the heated hose.

6. The system of claim 1, wherein the first unpressurized container comprises an isocyanate-containing material and the second unpressurized container comprises a polyol-containing material, thereby providing a plural component dispensing system configured for application of a polyurethane foam from the hand held applicator.

7. The system of claim 1, configured for dispensing of one or more of a polyurethane composition, a polyurethane foam, a polyurethane adhesive, or a polyurea composition.

8. The system of claim 1, wherein the hand held applicator comprises a valve plunger configured to allow air to flow continuously through the hand held applicator and the nozzle when the part A and part B materials streams are not flowing.

\* \* \* \* \*